United States Patent [19]
Rawlings

[11] Patent Number: 5,533,355
[45] Date of Patent: Jul. 9, 1996

[54] SUBTERRANEAN HEAT EXCHANGE UNITS COMPRISING MULTIPLE SECONDARY CONDUITS AND MULTI-TIERED INLET AND OUTLET MANIFOLDS

[75] Inventor: John P. Rawlings, Oklahoma City, Okla.

[73] Assignee: Climate Master, Inc., Oklahoma City, Okla.

[21] Appl. No.: 335,567

[22] Filed: Nov. 7, 1994

[51] Int. Cl.$^6$ .............................. F24J 3/08; F28D 20/00
[52] U.S. Cl. ............................ 62/260; 62/230.7; 165/45; 165/144; 165/175; 165/DIG. 471
[58] Field of Search ................................ 62/260, 238.7; 165/45, 46, 144, 173, 175

[56] References Cited

U.S. PATENT DOCUMENTS

| | | |
|---|---|---|
| 1,908,733 | 5/1933 | Creel . |
| 1,951,420 | 3/1934 | Jones .................... 257/239 |
| 2,181,953 | 12/1939 | Usselman ................... 165/45 |
| 2,461,449 | 2/1949 | Smith et al. ................. 165/45 |
| 2,513,373 | 7/1950 | Sporn et al. ................. 165/45 |
| 2,611,584 | 9/1952 | Labus ......................... 257/50 |
| 3,656,547 | 4/1972 | Beach ........................ 165/106 |
| 4,036,286 | 7/1977 | Anderson et al. ........... 165/45 |
| 4,036,294 | 7/1977 | Ecker ........................ 165/154 |
| 4,257,239 | 3/1981 | Partin et al. .............. 62/238.7 |
| 4,286,651 | 9/1981 | Steiger et al. ............... 165/45 |
| 4,325,228 | 4/1982 | Wolf ............................ 62/260 |
| 4,360,056 | 11/1982 | O'Connell ................... 165/45 |
| 4,373,573 | 2/1983 | Madwed ........................ 165/2 |
| 4,394,817 | 7/1983 | Remillard .................... 165/46 |
| 4,407,351 | 10/1983 | Backlund ...................... 165/1 |
| 4,412,126 | 10/1983 | Brockway ................... 219/553 |
| 4,452,229 | 6/1984 | Powers ...................... 126/429 |
| 4,483,318 | 11/1984 | Margen ..................... 126/400 |
| 4,512,156 | 4/1985 | Nagase ..................... 60/641.2 |
| 4,538,673 | 9/1985 | Partin et al. ................ 165/45 |
| 4,556,101 | 12/1985 | Haldeman ................... 165/45 |
| 4,574,875 | 3/1986 | Rawlings et al. ............ 165/45 |
| 4,657,074 | 4/1987 | Tomita et al. .............. 165/179 |
| 4,693,300 | 9/1987 | Adachi .......................... 165/1 |
| 4,714,108 | 12/1987 | Barry ......................... 165/45 |
| 4,741,386 | 5/1988 | Rappe ......................... 165/45 |
| 4,753,285 | 6/1988 | Rawlings ..................... 165/45 |
| 4,821,797 | 4/1989 | Allgäuer et al. ............ 165/141 |
| 4,880,051 | 11/1989 | Ohashi ........................ 165/45 |
| 4,911,229 | 3/1990 | McElroy ...................... 165/45 |
| 5,054,541 | 10/1991 | Tripp ......................... 165/45 |
| 5,069,199 | 12/1991 | Messner ..................... 126/400 |
| 5,081,848 | 1/1992 | Rawlings et al. ........... 62/260 |
| 5,103,899 | 4/1992 | Kalina .................... 165/104.13 |
| 5,244,037 | 9/1993 | Warnke ....................... 62/260 |
| 5,251,689 | 10/1993 | Hakim-Elahi ................ 165/46 |

FOREIGN PATENT DOCUMENTS

| | | |
|---|---|---|
| 0056797 | 1/1982 | European Pat. Off. . |
| 0047223 | 10/1982 | European Pat. Off. . |
| 0207911 | 1/1987 | European Pat. Off. . |
| 2296828 | 12/1197 | France . |
| 2850865 | 11/1978 | Germany . |
| 2928893 | 7/1979 | Germany . |
| 3206577 | 2/1982 | Germany . |
| 3913429 | 5/1988 | Germany . |

*Primary Examiner*—Allen J. Flanigan
*Attorney, Agent, or Firm*—McKinney, Stringer & Webster

[57] ABSTRACT

An improved ground source heat pump system wherein the subterranean piping installation comprises modular heat exchange units. Each modular heat exchange unit comprises a plurality of parallel secondary conduits. The secondary conduits are connected between primary conduits by means of multi-tiered inlet and outlet manifolds. Each manifold comprises a three-way "T" or end member and at least one and probably several four-way connecting members. Each of the end members has one inlet and at least one and preferably two outlets. Each connecting member has one inlet and at least two and preferably three outlets. The inlets and outlets of the end members and connecting members are configured to interconnect interchangeably in male-female fashion. Elbow units are used to connect the ends of the secondary conduits with the inlets and outlet of the end members and connecting members. Thus, only two types of components are necessary to build heat exchange units having any number of secondary conduits. To increase the number of secondary conduits in a unit, additional connecting members are added. This eliminates the need to build a different manifold for each size heat exchange unit.

26 Claims, 4 Drawing Sheets

SUBTERRANEAN HEAT EXCHANGE UNITS COMPRISING MULTIPLE SECONDARY CONDUITS AND MULTI-TIERED INLET AND OUTLET MANIFOLDS

FIELD OF THE INVENTION

The present invention relates to ground source heat pump systems.

SUMMARY OF THE INVENTION

The present invention is directed to a subterranean heat exchange unit adapted for connection between the supply and return headers of a conduit system which connects a subterranean heat exchanger with a ground source heat pump in a structure. The heat exchange unit comprises a first primary conduit having first and second ends. The first end is connectable to the supply header for receiving heat transfer fluid therefrom. The heat exchange unit further comprises a plurality of secondary conduits, each such secondary conduit having first and second ends, and a second primary conduit having first and second ends, the second end being connectable to the return header.

The secondary conduits and the first and second primary conduits are connected by means of an inlet and outlet manifold. The inlet manifold comprises a first connecting member having an inlet connected to the second end of the first primary conduit, a first outlet connected to the first end of a first one of the plurality of secondary conduits, and a second outlet. The inlet manifold further comprises an end member having an inlet connected to the second outlet of the first connecting member and a first outlet connected to the first end of a second one of the plurality of secondary conduits.

The outlet manifold comprises an end member having a first inlet connected to the second end of the first one of the plurality of secondary conduits and an outlet. The outlet manifold further comprises a first connecting member having a first inlet connected to the outlet of the end member, a second inlet connected to the second end of the second one of the plurality of secondary conduits, and an outlet connected to the first end of the second primary conduit.

Still further, the present invention includes a ground source heat pump system for a structure wherein the system includes a heat pump assembly in the structure for adjusting the temperature of a fluid in the structure, a subterranean heat exchanger, a conduit system for circulating a heat transfer fluid between the heat pump assembly in the structure and the subterranean heat exchanger, and a pump for pumping the heat transfer fluid through the conduit system. The subterranean heat exchanger comprises a supply and return header and at least one heat exchange unit connected between the return and supply headers, wherein each of the heat exchange units comprises the inlet and outlet manifolds as described herein.

BRIEF DESCRIPTION OF THE DRAWINGS

FIG. 6 is a cross-sectional view taken along the line 6—6.

DETAILED DESCRIPTION OF THE PREFERRED EMBODIMENTS

Figure 1:
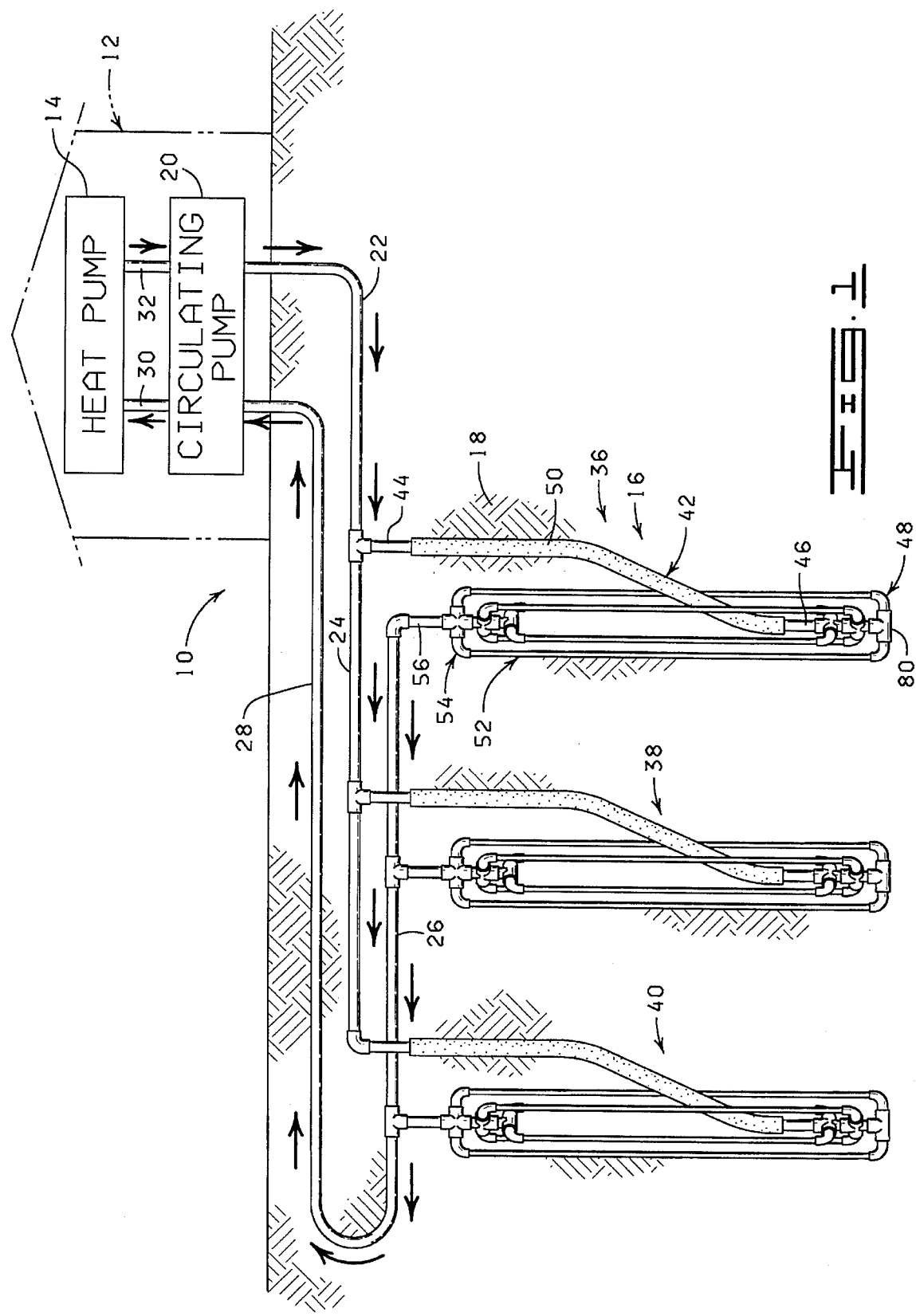
FIG. 1 is a schematic illustration of a ground source heat pump system constructed in accordance with the present invention.

With the decreasing availability of fossil fuels and the rising cost of fuels and electrical power, the need for efficiency in the operation of air conditioning and water heating systems becomes increasingly important. Because they reduce the need for heating or cooling created by external energy, ground source heat pumps are becoming a preferred type of air conditioning system and are also proving efficacious for water heating systems.

A ground source heat pump typically is employed to heat or cool the room air in a structure or to heat water for use in the structure. As used herein, the term "fluid" refers to air or water or to any fluid in the structure to be heated and/or cooled. The heat pump assembly in the structure transfers heat between the fluid in the structure and an underground piping installation. This is accomplished by circulating a heat transfer fluid through a conduit system which connects the heat pump in the structure with a subterranean heat exchanger. The subterranean heat exchanger dumps or sinks heat into, or recovers heat from, the surrounding earth or water in which the heat exchanger is installed.

Ground source or "earth coupled" heat pumps can provide a supply of heat and a reservoir for dumping heat on a year round basis and require substantially less energy for operation. This reduces the cost to the consumer and contributes to energy conservation in general. In extreme climates, a ground source heat pump can be augmented by a fossil fuels or electric heater, if needed. Normally, an efficient ground source heat pump entirely supplants conventional electrical and fossil fuel units. Nevertheless, ground source heat pump systems have disadvantages.

In particular, the piping installations of conventional ground source systems require extensive lengths of pipe to achieve an adequate heat exchange capacity, especially for larger commercial or industrial facilities. The extreme pipe lengths require highly detailed designing to insure proper turbulent flow patterns, flow rate and heat exchange. Further, the extensive lengths of pipe required are costly, and installation is labor-intensive. Finally, a large land mass is necessary to accommodate the lengthy piping installation.

The present invention is directed to an improvement in ground source heat pump systems utilizing modular subterranean heat exchange units in the subterranean piping installation. Each of the modular subterranean units of this invention comprises a primary conduit and multiple secondary conduits, and each unit is formed of flexible, plastic material.

The primary conduit, which receives heat transfer fluid from the conduit system and directs it to the secondary conduits, may be insulated to prevent thermal interference between the primary and secondary conduits and to enhance the overall heat transfer performance of the system. The use of multiple secondary conduits substantially increases the surface area of the interface between the heat exchanger unit and the surrounding ground or water and, thus, the overall heat exchange capacity of the system.

Because the subterranean heat exchange units are prefabricated modular units, on-site assembly is eliminated and installation of the system is greatly simplified. In the preferred embodiment, the units are manufactured in a range of standard sizes which provide known heat exchange capacities. This substantially reduces the time conventionally required to design the system generally, and more specifically, to calculate the numbers, lengths and diameters of the underground pipes. Instead, once a desired heat exchange capacity is selected, the possible combinations of standard modular heat exchange units is easily determined.

Due to the use of integrally formed units of flexible plastic, errors in implanting the units can be corrected without disassembling or damaging the units. In addition, the total land mass required to contain the modular conduits with multiple parallel branch conduits is less than that required for conventional underground or subterranean piping installations comprising extended lengths of pipes.

Still further, the assembly of the heat exchange units is facilitated by the use of interchangeable manifold components. Each manifold comprises a three-way, or T-shaped, end member which has at least two and preferably three openings, and a four-way connecting member. The structure of the end members and connecting members is the same, regardless of whether the member is used in the inlet or outlet manifold. In the end member, all three openings are provided with a female fusion fitting, whereas in the connecting member one of the openings is provided with a male fusion fitting. The female fusion fittings are connected either to elbow joints or to male fittings of other connecting members.

Thus, as described in more detail below, the end members and connecting members are completely interchangeable. To increase the number of secondary conduits, additional connecting members are linked together in the inlet and outlet manifolds. Thus, these same two components can be used to assemble heat exchange units having different numbers of secondary conduits. For example, the manifolds in a heat exchange unit comprising only two secondary conduits requires a pair of end members only. For four conduits, a connecting member is added to each end member. For six conduits, two connecting members are included in each manifold, as so forth. Thus, the number of different parts which must be manufactured and maintained in inventory is greatly reduced without compromising the capacity to quickly assembly a unit with the desired number of secondary conduits.

With reference now to the drawings in general and to FIG. 1 in particular, there is shown therein a ground source heat pump system in accordance with the present invention, designated generally by the reference numeral 10. The system 10 is associated with a structure 12 (shown in broken lines). The structure 12 may be a single or multi-family dwelling, commercial building, or any other structure in which there is a need to adjust the temperature of a selected fluid, such as air or water.

The system 10 comprises a ground source heat pump assembly 14 in the structure for adjusting the temperature of a selected fluid. The heat pump assembly 14 is of conventional design and, thus, is not described or shown herein in detail. The heat pump assembly 14 generally includes a first heat exchanger such as an evaporator\condenser unit (not shown). Heat is transferred between the refrigerant in a refrigerant circuit in the evaporator\condenser and the fluid medium which heats or cools the fluid in the structure.

In a water-to-air air conditioning system, a blower (not shown) is included in the assembly 14 for distributing the temperature-conditioned air throughout the interior of the structure 12. In a water-to-water air conditioning system, a suitable fluid distribution system (not shown) is included instead of the blower.

With continuing reference to FIG. 1, the system 10 further comprises an underground or subterranean heat exchanger assembly 16 comprising an array of heat exchange units installed in the earth 18 or in a pond or lake. The heat exchanger assembly 16 may be arranged vertically in boreholes or horizontally in trenches or supported in a suitable manner in a body of water. While the configuration and construction of the subterranean heat exchanger assembly 16 may vary, the assembly generally is adapted for permitting the transfer of heat between the heat transfer fluid and the surrounding earth 18 (or water).

Thus, in the cooling mode, heat in the heat transfer fluid is transferred into the cooler earth surrounding the heat exchanger assembly 16. Likewise, in the heating mode, warmth from the surrounding earth is absorbed by the cooler heat transfer fluid. The heat transfer fluid may be water or a water and antifreeze solution.

A pumping unit 20 is provided for circulating the heat transfer fluid between the heat pump assembly 14 and the subterranean heat exchanger assembly 16. A supply line 22 carries the fluid from the pump 20 through a supply header 24 to the assembly 16. The fluid is returned to the pump 20 through a return header 26 and a return line 28. Heat transfer fluid is circulated between the circulating pump 20 and the heat pump assembly 14 by means of supply and return conduits 30 and 32, respectively. The return and supply headers 24 and 26 and much of the return and supply lines 22 and 28 are buried several feet underground in trenches.

Referring still to FIG. 1, the underground heat exchanger assembly 16 comprises a plurality of heat exchange units. It will be understood that the number and size of the units may vary widely. For illustration purposes only, the units are depicted in FIG. 1 as including a first heat exchange unit 36, a second heat exchange unit 38 and a third heat exchange unit 40, all arranged in parallel fashion.

Figure 2:
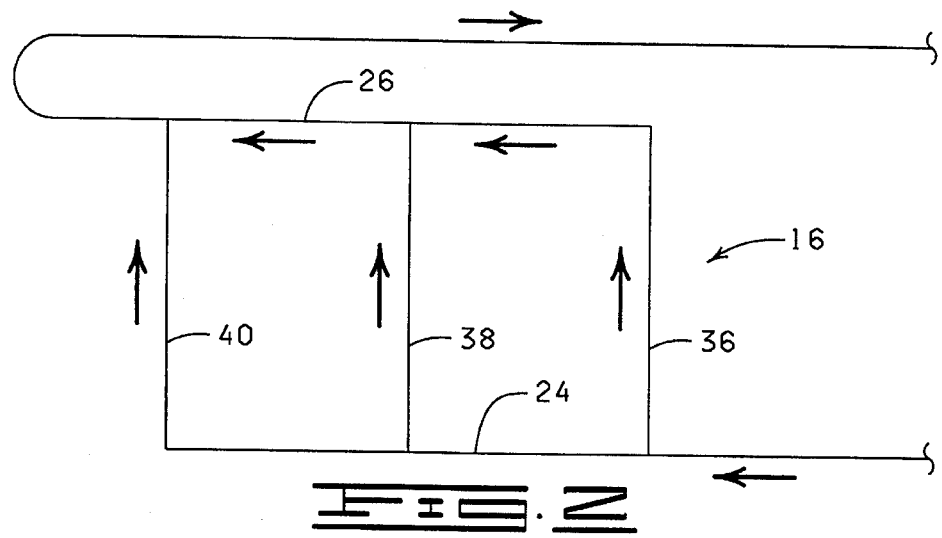
FIG. 2 is a schematic illustration of the array of heat exchange units in the subterranean heat exchanger of the system shown in FIG. 1 wherein the heat exchange units are arranged for reverse return of the heat transfer fluid.

Referring now to FIG. 2, the parallel heat exchange units 36, 38 and 40 of the assembly 16 may be arranged in reverse return fashion. In this configuration, also depicted in FIG. 1, the units are arranged so that the first unit 36 connects to the return header 26 upstream of the second unit 38 and the third unit 40 connects to the return header 26 downstream of the second unit 38.

Figure 3:
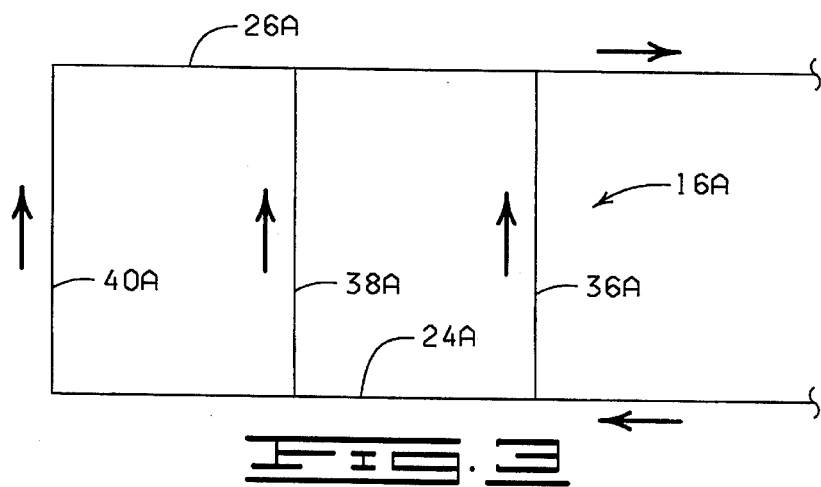
FIG. 3 is a schematic illustration of an array of heat exchange units designed for direct return of the heat transfer fluid in accordance with another embodiment of the present invention.

Alternately, the parallel heat exchange units may be configured in direct return fashion, as depicted in the diagram of FIG. 3. In this arrangement, the first unit 36A of the assembly 16A connects to the return header 26A downstream of the second unit 38A and the third unit 40A connects to the return header 26A upstream of the second unit 38A.

Each of the heat exchange units 36, 38 and 40 preferably is similarly formed. Thus, only the heat exchange unit 36 will be described in detail herein. Returning to FIG. 1 and referring now also to FIG. 4, the unit 36 includes a first primary conduit 42. The first primary conduit 42 has a first end 44 connected to receive fluid from the supply header 24. The second end 46 of the primary conduit 42 is connected to the inlet manifold 48, to be described in more detail hereafter. The first primary conduit 42 may be covered with insulation 50, such as a layer of closed cell, waterproof insulating material.

The inlet manifold 48 feeds the heat transfer fluid to a plurality of secondary conduits, designated generally by the reference numeral 52. The secondary conduits 52 feed the heat transfer fluid back into an outlet manifold 54 which is connected to one end of a second primary conduit 56 which directs the fluid to the return header 26.

Figure 5:
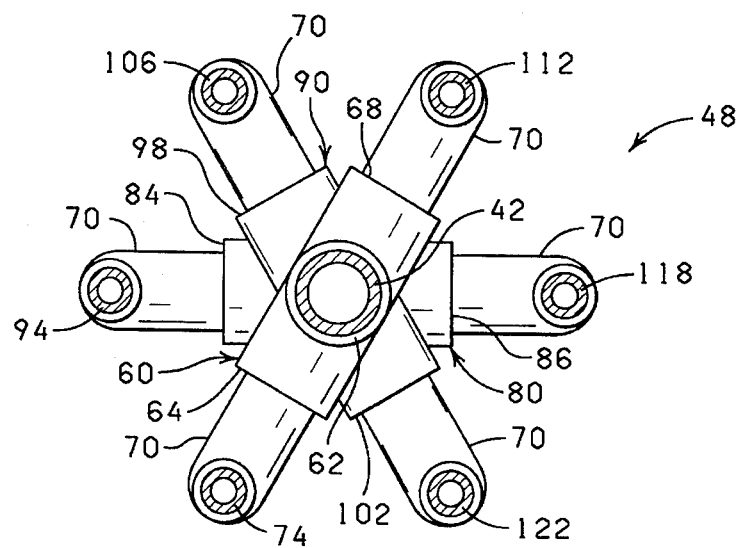
FIG. 5 is a further enlarged, fragmented view showing the inlet manifold of the heat exchange unit in exploded form.

The construction of the inlet manifold 48 is best illustrated in FIGS. 5 and 6, to which attention now is directed. It will be appreciated that the components of the outlet manifold 54 are formed substantially the same as the inlet manifold 48 except that the components are arranged in reverse order to collect the heat transfer fluid and direct the fluid to the return header 26.

The inlet manifold 48 comprises a first connecting member 60. The first connecting member 60 comprises an inlet 62 connected to the second end 46 (see also FIG. 4) of the first primary conduit 42. The first connecting member 60 further includes a first outlet 64, a second outlet 66 and a third outlet 68. The inlet 62 and the first and third outlets 64 and 68 preferably are formed as female fusion fittings, and the second outlet 66 preferably is formed as a male fusion fitting, all for reasons which will become apparent hereafter.

The first outlet 64 and the third outlet 68 receive elbow joints, all of which are designated by the reference number 70, as all the elbow joints may be identically formed. The elbow joints 70 each have a male end, which connects to the outlet 68 (or other opening in the manifold as described elsewhere herein), and female end by which it is connected to the first end 72 of a first one 74 of the plurality of secondary conduits 52 (or to the ends of other secondary conduits as described elsewhere herein).

The inlet manifold 48 further comprises an end member 80 which is generally "T" shaped having an inlet 82 and first and second outlets 84 and 86. The inlet 82 is connected to the second outlet 66 of the first connecting member 60. This connection may be indirect, that is, through a second connecting member 90. Or, where only 4 secondary conduits are needed, the connection may be direct (not shown) so that the second outlet 66 of the first connecting member 60 is inserted directly into the inlet 82 of the end member 80. The first outlet 84 of the end member 80 receives an elbow 70 by which it is connected to the second end 92 of a second one 94 of the plurality of secondary conduits 52.

As indicated above, the inlet manifold 48 may include a second connecting member 90. The second connecting member 90 is identical to the first connecting member 60, and has an inlet 96, a first outlet 98, a second outlet 100 and a third outlet 102. The inlet 96 is connected to the second outlet 66 of the first connecting member 60, and the second outlet 100 is connected to the inlet 82 of the end member 80. The first outlet 98 is connected, by an elbow joint 70 as previously described, to the first end 104 of a third one 106 of the plurality of secondary conduits.

In the embodiment shown, the plurality of secondary conduits 52 includes a total of six. In this case the third outlet 68 of the first connecting member 60 is connected to the first end 110 of a fourth one 112 of the plurality of secondary conduits 52. The second outlet 86 of the end member 80 is connected, by an elbow joint 70, to the first end 116 of a fifth one 118 of the plurality of secondary conduits 52. The third outlet 102 of the second connecting member 90 is connected, by an elbow joint 70, to the first end 120 of a sixth one 122 of the plurality of secondary conduits 52.

Thus, heat transfer fluid flows from the first primary conduit 42 through the first connecting member 60 of the inlet manifold 48 and into the first and fourth secondary conduits 74 and 112 and into the second connecting member 90. Through the second connecting member 90, the heat transfer fluid flows into the third and sixth secondary conduits 106 and 122 and into the end member 80. The end member 80 directs the fluid into the second and fifth secondary conduits 94 and 118. Fluid in the secondary conduits 52 is reunited in the outlet manifold 54 and directed back to the return header 26 through the second primary conduit 56.

Figure 4:
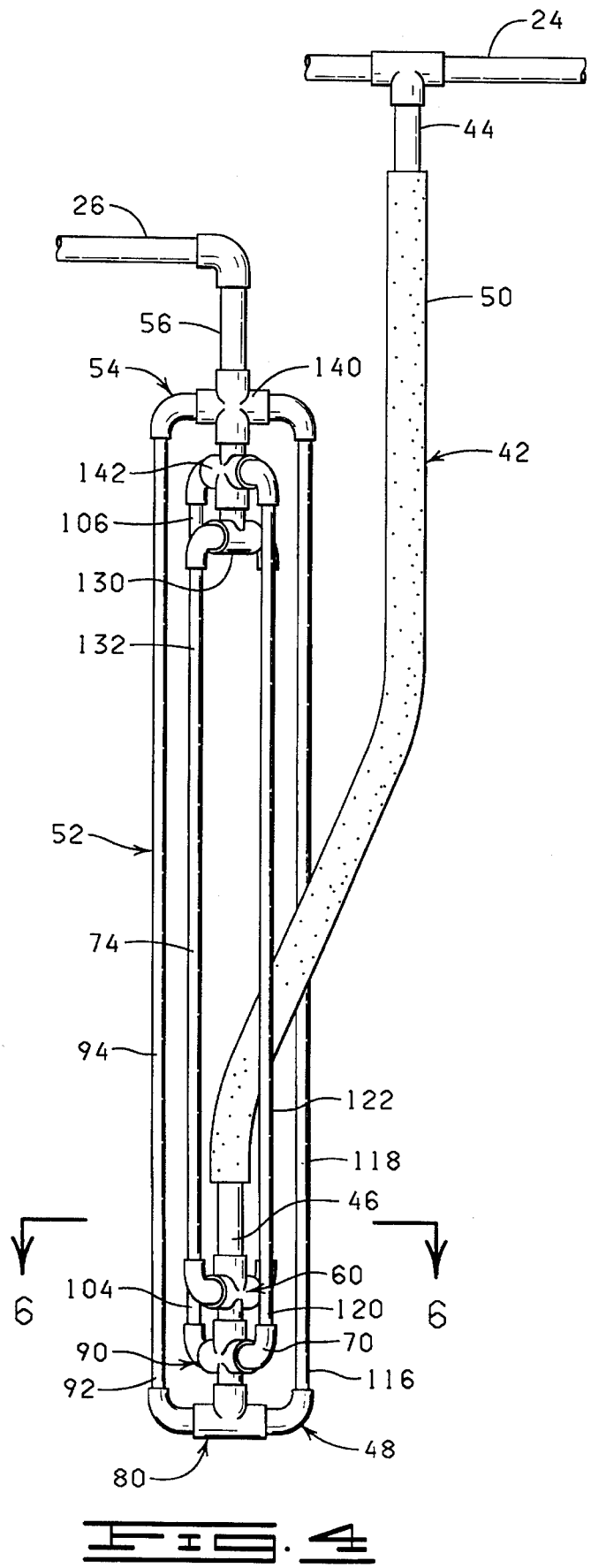
FIG. 4 is an enlarged side elevational view of a heat exchange unit in accordance with the present invention showing the inlet and outlet manifolds.
Figure 5:
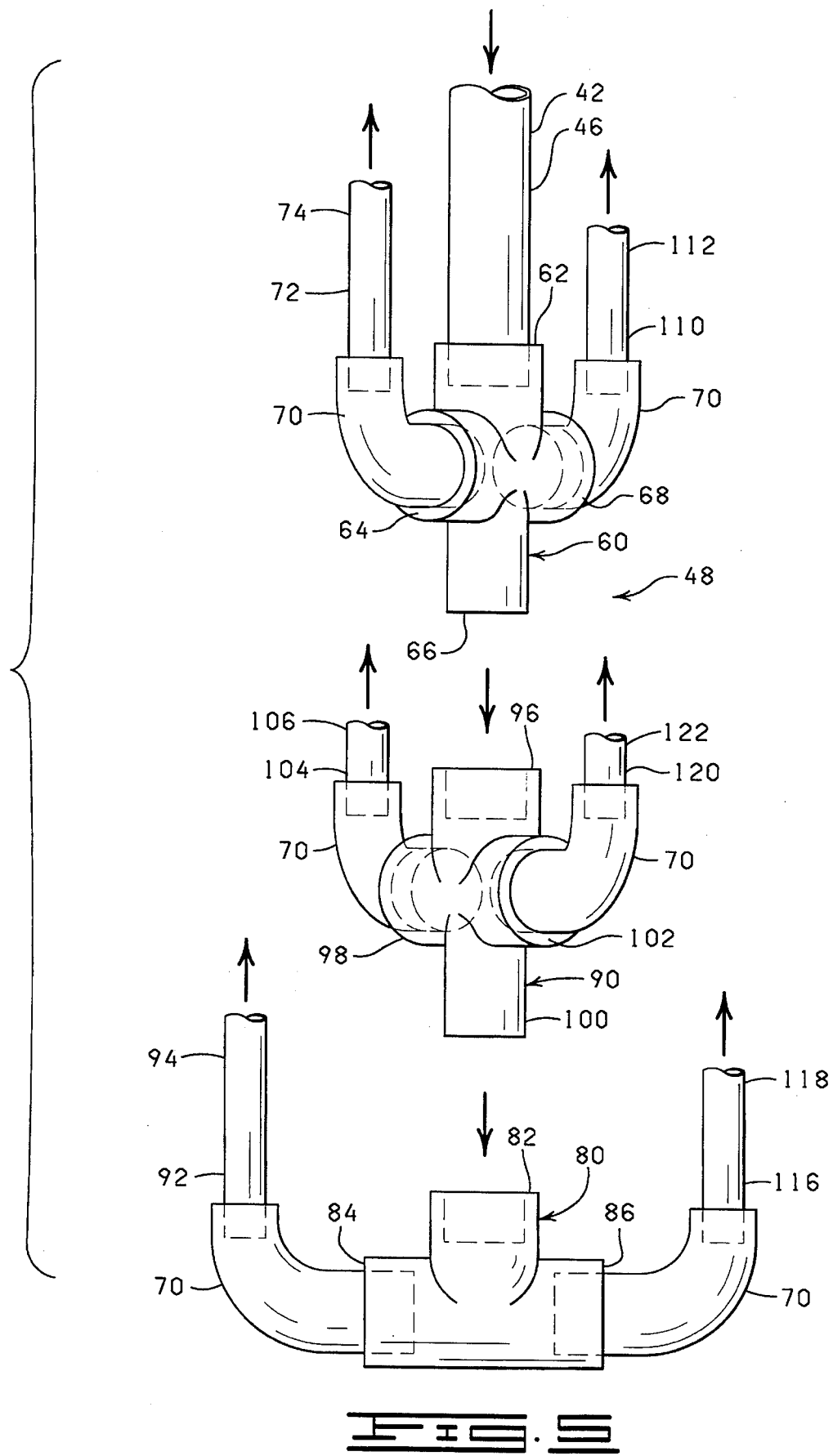

As illustrated in FIG. 4, the outlet manifold 54 basically is a mirror image of the inlet manifold 48. Thus, the outlet manifold 54 comprises an end member 130 having inlets which receive the second ends of the first and fourth secondary conduits 74 and 112, respectively, and an outlet. The outlet manifold 54 further comprises a first connecting member 140 and a second connecting member 142 between the first connecting member and the end member 130. The first connecting member 140 has inlets connected to the second and fifth secondary conduits 94 and 118, and an outlet connected to the second primary conduit 56. The second connecting member 142 has inlets connected to the outlet of the end member 130 and to the third and sixth secondary conduits 106 and 122, respectively, and an outlet connected to an inlet on the first connecting member 140.

Regardless of the number or configuration of the secondary conduits 52, usually it will be preferable for the secondary conduits to receive heat exchange fluid in parallel fashion from the first primary conduit 42 and to feed back into the second primary conduit 56. Consequently, in most applications, the diameter of the secondary conduits 52 will be smaller than the diameter of the primary conduits. Thus, each of the underground heat exchange units of this invention provides a relatively large surface area for interfacing with the surrounding earth 18 (or water). As a result, the heat transfer capability of the entire underground heat exchanger assembly 16 is enhanced.

In accordance with the present invention, the supply and return lines 22 and 28, the supply and return headers 24 and 26 and the heat exchange units 36, 38 and 40 are constructed of a flexible, plastic material. A preferred material is high density polyethylene or polybutylene pipe, which is inert, noncorrosive and very flexible.

The flexibility of the plastic material of which the components of the heat exchange units are made is an important feature of this invention and provides several advantages. For example, as described herein the modular heat exchange units may be several hundred feet in length, and the flexibility of the material allows these units to be shipped and stored in rolls. Still further, the flexibility simplifies installation of these long units in that the extended lengths of piping can be unrolled and easily manipulated as the tubing is fed into the borehole.

In the preferred practice of this invention, each heat exchange unit comprising the underground heat exchanger assembly 16 is integrally formed. To this end, the manifolds 48 and 54 are heat fused to the primary and secondary conduits 42, 52 and 56. Similarly, the individual components of the manifolds—end members, connecting members and elbow joints—are heat fused together. Although socket fusions are shown herein, those skilled in the art will appreciate that butt fusion techniques may be used as well. This produces, in effect, a solid unitary structure.

The underground heat exchanger assembly and accompanying return and supply headers and return and supply lines, are installed in the earth or in ground water. In a preferred earth installation method, a vertical borehole is drilled into the earth for each modular heat exchange unit. Then the unit is dropped into the borehole and connected to the return and supply headers. The borehole typically is "back filled" with a heat conductive filler, such as soil, bentonite or water, for example. Now it will be understood that one advantageous feature of the modular heat exchange units is that the secondary conduits, where most of the heat exchange occurs, are unenclosed. This permits one step back filling of the borehole.

Still further, the secondary conduits of each heat exchange unit preferably are spaced a distance apart from each other, but the common area surrounding the secondary conduits is substantially unobstructed. In this way, fluid flow around the secondary conduits is practically unobstructed in all directions. Again, this permits easy back filling in the case of earth installations, and where the units are supported in ground water, good circulation of surrounding water is enhanced.

The lengths and internal diameters of the first and second primary conduits and the secondary conduits are selected to produce a desired flow pattern and flow rate, which further enhances the heat exchange capacity of the system. In most instances, all the heat exchange units in a particular system will be the same length and will be similarly formed.

Although dimensions will vary depending on the particular installation, the return and supply headers typically will be at least 10 feet in length and will have an internal diameter of at least 1.25–2.00 inches. The dimensions of the return and supply lines will depend primarily on the location of the underground installation relative to the structure it will serve.

Preferably, the fluid capacity of the heat exchange units is less than the capacity of the headers 24 and 26. Most underground heat exchanger assemblies 16 will comprise 2 to 10 modular heat exchange units. A standard heat exchange unit may have 2 to 6 secondary conduits. The dimensions of the primary and secondary conduits will vary, as will the manifolds.

In one preferred embodiment, each of the connecting members of the manifolds has three one-inch female fusion fittings and one one-inch male fusion fitting. Thus, the female fusion fittings receive two elbow joints and either a primary conduit or a male fusion fitting on another connecting member. Each of the end members has three one-inch female fusion fittings. Each of the elbows has a one-inch male fusion fitting on one end to fit into one of the female fittings on another connecting member, and one ⅜ths inch female fitting on the other end to receive the end of a secondary conduit. Alternatively, the female fusion fitting on the elbow may be one-half inch to accommodate secondary conduits of greater diameter.

As described, the underground heat exchange units may be manufactured in a variety of standard sizes and configurations. For example, one preferred standard unit will comprise secondary conduits which are about 50 feet or more in length with an internal diameter of at least 0.25–0.50 inch. The first primary conduits of this unit would be of limited length, sufficient to connect the supply header and the secondary conduits, with an internal diameter of about 0.85 to about 1.10 inches. Other standard unit sizes may include, for example, units comprising secondary conduits which have lengths of 75, 100, 200 and 400 feet.

Now it will be understood that, once standard sizes and configurations for underground units are selected, the heat exchange capacity of each size unit can be calculated and provided to the system designer. The designer then, based on these given figures, can simply select a suitable size and number of units. These can be delivered to the installation site and attached as completed units to the return and supply headers of the subterranean heat exchanger.

Changes may be made in the combination and arrangement of the various parts, elements, steps and procedures described herein without departing from the spirit and scope of the invention as defined in the following claims.

What is claimed is:

1. A ground source heat pump system for a structure, the system comprising:

a heat pump assembly in the structure for adjusting the temperature of a fluid in the structure;

a subterranean heat exchanger;

a conduit system for circulating a heat transfer fluid between the heat pump assembly in the structure and the subterranean heat exchanger;

a pump for pumping the heat transfer fluid through the conduit system;

wherein the subterranean heat exchanger comprises a supply and return header and at least one heat exchange unit connected between the return and supply headers;

wherein each of the at least one heat exchange units comprises:

a first primary conduit having first and second ends, the first end connected to the supply header for receiving heat transfer fluid therefrom;

a plurality of secondary conduits, each such secondary conduit having first and second ends;

a second primary conduit having first and second ends, the second end being connected to the return header;

an inlet manifold comprising:

a first connecting member having an inlet connected to the second end of the first primary conduit, a first outlet connected to the first end of a first one of the plurality of secondary conduits, and a second outlet; and an end member having an inlet connected to the second outlet of the first connecting member and a first outlet connected to the first end of a second one of the plurality of secondary conduits; and an outlet manifold comprising:

an end member having a first inlet connected to the second end of the first one of the plurality of secondary conduits and an outlet; and a first connecting member having a first inlet connected to the outlet of the end member, a second inlet connected to the second end of the second one of the plurality of secondary conduits, and an outlet connected to the first end of the second primary conduit.

2. The ground source heat pump system of claim 1 wherein the first primary conduit is insulated.

3. The ground source heat pump system of claim 1 wherein each subterranean heat exchange unit comprises from 2 to 6 secondary conduits.

4. The ground source heat pump system of claim 1 wherein the subterranean heat exchange units are arranged in direct return fashion.

5. The ground source heat pump system of claim 1 wherein the subterranean heat exchange units are arranged in reverse return fashion.

6. The ground source heat pump system of claim 1 wherein the secondary conduits in the subterranean heat exchange units are smaller in diameter than the primary conduits.

7. The ground source heat pump system of claim 1 wherein the plurality of secondary conduits includes a third secondary conduit; wherein the inlet manifold comprises a second connecting member having an inlet connected to the second outlet of the first connecting member, having a first outlet connected to the first end of the third secondary conduit, and having a second outlet connected to the inlet of the end member, so that the second outlet of the first connecting member of the inlet manifold is connected indirectly to the inlet of the end member; and wherein the outlet manifold comprises a second connecting member having a first inlet connected to the second end of the third one of the secondary conduits, having a second inlet connected to the outlet of the end member of the outlet manifold, and having an outlet connected to the first inlet of the first connecting member of the outlet manifold so that the first inlet of the first connecting member and the outlet of the end member are connected indirectly.

8. The ground source heat pump system of claim 7 wherein the first connecting member of the inlet manifold has a third outlet connected to the first end of a fourth one of the plurality of secondary conduits, wherein the end member of the inlet manifold has a second outlet connected to the first end of a fifth one of the plurality of secondary conduits, wherein the second connecting member has a third outlet connected to the first end of a sixth one of the plurality of secondary conduits, wherein the end member of the outlet manifold has a second inlet connected to the second end of the fourth secondary conduit, wherein the third inlet of the first connecting member of the outlet manifold is connected to the second end of the fifth secondary conduit, and wherein the third inlet of the second connecting member of the outlet manifold is connected to the second end of the sixth secondary conduit.

9. The ground source heat pump system of claim 1 wherein each of the inlet and outlet manifolds comprises a plurality of connecting members, wherein each connecting member of the inlet manifold has an inlet connected either to the second end of the first primary conduit or to an outlet of another connecting member in the inlet manifold, wherein each connecting member of the inlet manifold has an outlet connected either to an inlet of the end member of the inlet manifold or to an inlet of another connecting member, wherein each of the connecting members of the outlet manifold has an inlet connected to an outlet of the end member of the outlet manifold or an outlet of another connecting member, and wherein each connecting member of the outlet manifold has an outlet connected to the first end of the second primary conduit or to the inlet of another connecting member.

10. The ground source heat pump system of claim 1 wherein each of the subterranean heat exchange units is modular.

11. The ground source heat pump system of claim 10 wherein each of the subterranean heat exchange units is formed of flexible, plastic material.

12. The ground source heat pump system of claim 1 wherein each of the subterranean heat exchange units is formed of flexible, plastic material.

13. A subterranean heat exchange unit adapted for connection between the supply and return headers of a conduit system which connects a subterranean heat exchanger with a ground source heat pump in a structure:

a first primary conduit having first and second ends, the first end connectable to the supply header for receiving heat transfer fluid therefrom;

a plurality of secondary conduits, each such secondary conduit having first and second ends;

a second primary conduit having first and second ends, the second end being connectable to the return header;

an inlet manifold comprising:
  a first connecting member having an inlet connected to the second end of the first primary conduit, a first outlet connected to the first end of a first one of the plurality of secondary conduits, and a second outlet; and
  an end member having an inlet connected to the second outlet of the first connecting member and a first outlet connected to the first end of a second one of the plurality of secondary conduits; and an outlet manifold comprising:
  an end member having a first inlet connected to the second end of the first one of the plurality of secondary conduits and an outlet; and
  a first connecting member having a first inlet connected to the outlet of the end member, a second inlet connected to the second end of the second one of the plurality of secondary conduits, and an outlet connected to the first end of the second primary conduit.

14. The heat exchange unit of claim 13 wherein the first primary conduit is insulated.

15. The heat exchange unit of claim 13 comprising from two to six secondary conduits.

16. The heat exchange unit of claim 13 wherein the secondary conduits in the subterranean heat exchange units are smaller in diameter than the primary conduits.

17. The heat exchange unit of claim 13 wherein the plurality of secondary conduits includes a third secondary conduit; wherein the inlet manifold comprises a second connecting member having an inlet connected to the second outlet of the first connecting member, having a first outlet connected to the first end of the third secondary conduit, and having a second outlet connected to the inlet of the end member, so that the second outlet of the first connecting member of the inlet manifold is connected indirectly to the inlet of the end member; and wherein the outlet manifold comprises a second connecting member having a first inlet connected to the second end of the third one of the secondary conduits, having a second inlet connected to the outlet of the end member of the outlet manifold, and having an outlet connected to the first inlet of the first connecting member of the outlet manifold, so that the first inlet of the first connecting member and the outlet of the end member of the outlet manifold are connected indirectly.

18. The heat exchange unit of claim 17 wherein the first connecting member of the inlet manifold has a third outlet connected to the first end of fourth one of the plurality of secondary conduits, wherein the end member of the inlet manifold has a second outlet connected to the first end of a fifth one of the plurality of secondary conduits, wherein the second connecting member has a third outlet connected to the first end of a sixth one of the plurality of secondary conduits, wherein the end member of the outlet manifold has a second inlet connected to the second end of the fourth secondary conduit, wherein the third inlet of the first connecting member of the outlet manifold is connected to the second end of the fifth secondary conduit, and wherein the third inlet of the second connecting member of the outlet manifold is connected to the second end of the sixth secondary conduit.

19. The heat exchange unit of claim 13 wherein each of the inlet and outlet manifolds comprises a plurality of connecting members, wherein each connecting member of the inlet manifold has an inlet connected either to the second end of the first primary conduit or to an outlet of another connecting member in the inlet manifold, wherein each connecting member of the inlet manifold has an outlet connected either to an inlet of the end member of the inlet manifold or to an inlet of another connecting member, wherein each of the connecting members of the outlet manifold has an inlet connected to an outlet of the end member of the outlet manifold or an outlet of another connecting member, and wherein each connecting member of the outlet manifold has an outlet connected to the first end of the second primary conduit or to the inlet of another connecting member.

20. The heat exchange unit of claim 13 wherein the heat exchange unit is modular.

21. The heat exchange unit of claim 20 wherein the heat exchange unit is formed of flexible, plastic material.

22. The heat exchange unit of claim 13 wherein the heat exchange unit is formed of flexible, plastic material.

23. A ground source heat pump system for a structure, the system comprising:

a heat pump assembly in the structure for adjusting the temperature of a fluid in the structure;

a subterranean heat exchanger;

a conduit system for circulating a heat transfer fluid between the heat pump assembly in the structure and the subterranean heat exchanger;

a pump for pumping the heat transfer fluid through the conduit system;

wherein the subterranean heat exchanger comprises a supply and return header and at least one heat exchange unit connected between the return and supply headers;

wherein each of the at least one heat exchange units comprises:

a first primary conduit having first and second ends, the first end connected to the supply header for receiving heat transfer fluid therefrom;

a plurality of secondary conduits, each such secondary conduit having first and second ends;

a second primary conduit having first and second ends, the second end being connected to the return header;

an inlet manifold comprising:

an end member having an inlet connected to the first primary conduit for receiving heat transfer fluid from the supply header, and wherein the end member further has two outlets, each such outlet connected to the first end of one of the plurality of secondary conduits; and an outlet manifold comprising:

an end member having an outlet connected to the second primary conduit for returning fluid to the return header, and further having two inlets, each such inlet connected to the second end of one of the plurality of secondary conduits;

and wherein each of the heat exchange units further comprises:

at least one connecting member in the inlet manifold having an inlet connected either to the second end of the first primary conduit or to an outlet of another connecting member, and each connecting member has three outlets, one such outlet connected either to the inlet of the end member of the inlet manifold or to the inlet of another connecting member, each of the other two outlets of the connecting member being connected to the first end of one of the secondary conduits; and at least one connecting member in the outlet manifold having three inlets, one such inlet connected either to the outlet of the end member or to the outlet of another connecting member, and wherein each of the other two inlets is connected to the second end of one of the plurality of secondary conduits, and wherein each of the connecting members further has an outlet connected either to the first end of the second primary conduit or to the inlet of another connecting member.

24. The ground source heat pump system of claim 23 comprising a plurality of connecting members in each of the inlet and outlet manifolds.

25. The ground source heat pump system of claim 23 wherein each of the heat exchange units is a module formed of flexible, plastic material.

26. The ground source heat pump system of claim 23 wherein the subterranean heat exchanger comprises two to ten heat exchange units.

* * * * *

UNITED STATES PATENT AND TRADEMARK OFFICE
CERTIFICATE OF CORRECTION

PATENT NO. : 5,533,355
DATED : April 16, 1997
INVENTOR(S) : John P. Rawlings

It is certified that error appears in the above-indentified patent and that said Letters Patent is hereby corrected as shown below:

On the Title Page of the patent, under U.S. PATENT DOCUMENTS, the following references are added:

4,030,541    6/1977    Gross et al.
    3,205,939    9/1965    Huet
      176,915    5/1876    Wood On the Title Page of the patent, under Foreign Patent Documents, line 16, delete "12/1197" and substitute therefor --12/1974--.

Signed and Sealed this

Seventeenth Day of June, 1997

Attest:

Attesting Officer

BRUCE LEHMAN

Commissioner of Patents and Trademarks